(No Model.) 2 Sheets—Sheet 1.
M. DICKERSON.
ELECTRICAL TRANSFORMER.
No. 536,608. Patented Apr. 2, 1895.
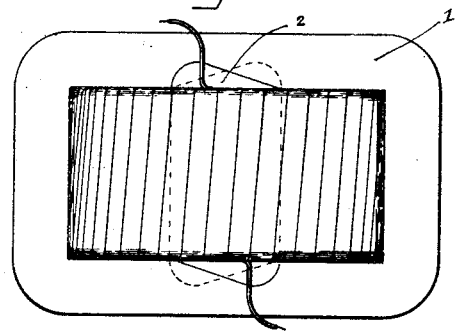
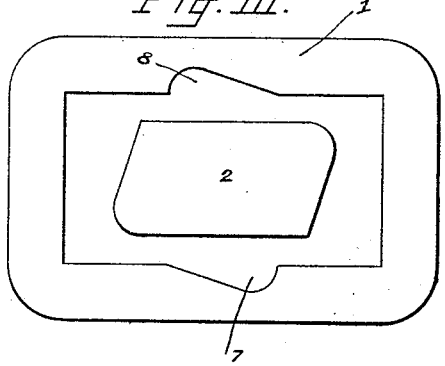
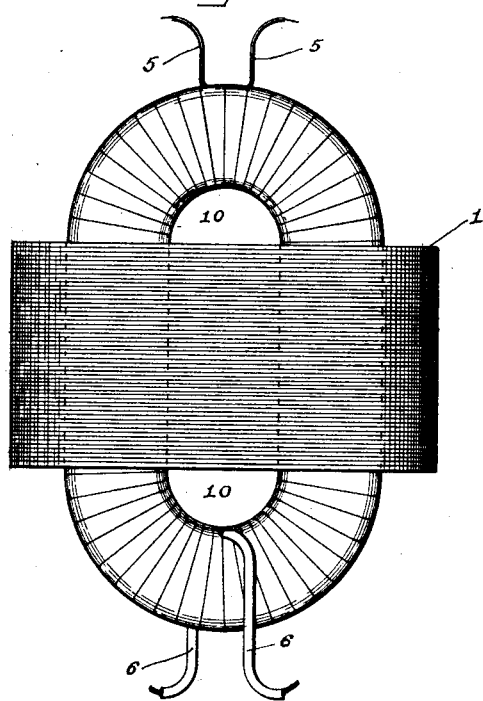
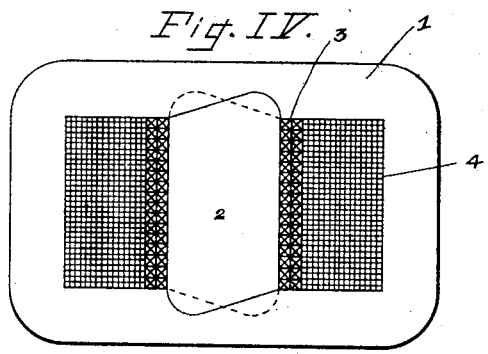
WITNESSES:
Malcolm Dickerson INVENTOR
BY Chapin & Denny
his ATTORNEYS.

(No Model.)　　　　　　　　　　　　　　　　　　2 Sheets—Sheet 2.
M. DICKERSON.
ELECTRICAL TRANSFORMER.
No. 536,608.　　　　　　　　　　　　Patented Apr. 2, 1895.
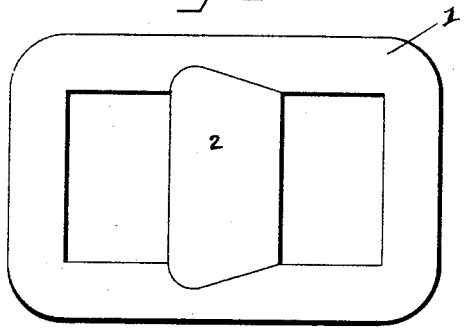
*Fig. V.*
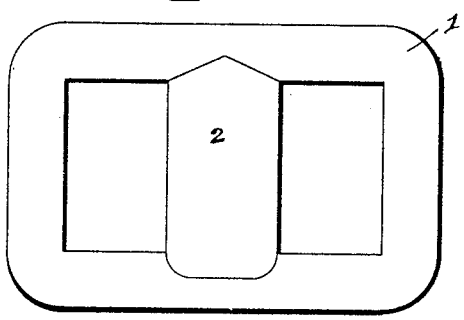
*Fig. VII.*
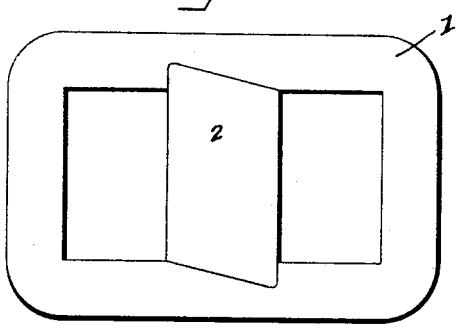
*Fig. VI.*
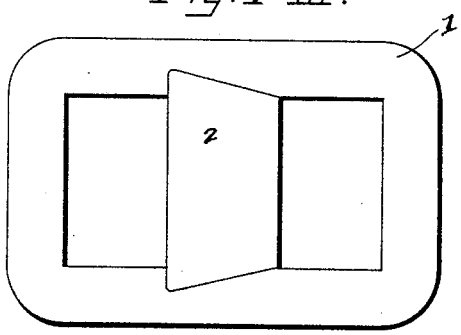
*Fig. VIII.*
WITNESSES:　　　　　Malcolm Dickerson INVENTOR
Thomas Duncan.
Geo. F. Felts　　　　　BY Chapin & Denny
　　　　　　　　　　　　his ATTORNEYS.

UNITED STATES PATENT OFFICE.

MALCOLM DICKERSON, OF FORT WAYNE, INDIANA, ASSIGNOR OF ONE-HALF TO JOHN F. CURTICE, OF SAME PLACE.

ELECTRICAL TRANSFORMER.

SPECIFICATION forming part of Letters Patent No. 536,608, dated April 2, 1895.

Application filed November 26, 1894. Serial No. 529,920. (No model.)

*To all whom it may concern:*

Be it known that I, MALCOLM DICKERSON, a citizen of the United States, residing at Fort Wayne, in the county of Allen, in the State of Indiana, have invented certain new and useful Improvements in Electrical Transformers; and I do hereby declare that the following is a full, clear, and exact description of the invention, which will enable others skilled in the art to which it appertains to make and use the same, reference being had to the accompanying drawings, which form part of this specification.

My invention relates to improvements in electrical transformers, inductoriums, induction-coils or converters designed and adapted for translating electric currents of any given potential into currents of a different potential; and relates particularly to an improved construction of the transformer core.

The object of my invention is to provide an improved inductive translator or transformer of simple and economical construction, adapted to be employed with increased efficiency for transforming or converting alternating currents of high potential and small current strength into a current of lower electromotive force and larger current strength or vice versa, on a local or secondary circuit provided with incandescent electric lamps or other electro-receptive devices.

Another object of my invention is to provide an improved core for electrical transformers, properly laminated to avoid useless expenditure of energy resulting from eddy or Foucault currents, having its laminæ so constructed and connected as to inclose the transformer coils in a symmetrical and compact form, adapted to be readily assembled around the coils in the construction of the core, in such a manner as to increase its practical convenience for repairs and ease of manufacture, and also having its plates or laminæ so united and interlocked as to provide a compact core presenting the nearest possible approach to a closed circuit for the magnetic flux consistent with a core composed of separable sections.

The novel feature of my invention is found in the magnetic organ of the transformer and consists in the construction by which a compact laminated transformer core of separable sections is secured, having but two magnetic air-gaps in each lamina, and presenting a more efficient method of bridging the air-gaps by my manner of breaking joints, thereby materially augmenting the magnetization of the core, with a given current strength, and the efficiency of the transformer.

The objects of my invention thus set forth, are secured by the mechanism illustrated in the accompanying drawings, forming part of this specification in which similar numerals of reference indicate corresponding parts throughout the several views.

Referring now to the drawings, Figure I is a plan of my improved transformer with the iron punchings in position showing the relative arrangement of the coils, the inclosing laminated core and the manner of breaking joints. Fig. II is a side elevation of the same. Fig. III is a detail of the two interlocking plates or iron stampings of the core. Fig. IV is a view in vertical transverse section of Fig. I. Figs. V, VI, VII, and VIII illustrate other modified forms of the interlocking plates of iron or steel stampings.

As an electric transformer or converter consists simply of two insulated electric conductors, one of which forms the primary circuit and the other the secondary circuit of the transformer, combined with an iron magnetic conductor or core forming the magnetic circuit of the converter, it follows that the converter is one of the simplest pieces of electro-magnetic apparatus, in which the principal room for improvement is found in either the construction or arrangement of the magnetic core.

The most difficult and desirable result to be obtained in increasing the efficiency of the present electrical transforming apparatus, is such a construction of the magnetic circuit as will secure the smallest number of magnetic air-gaps, consistent with an economical and convenient assembling of the separable and inclosing sections of the core. This I have sought to accomplish by my invention, the construction and operation of which I will now briefly describe.

The primary coil 1 and the secondary coil 3 may be wound for any desired ratio of conversion and arranged in any suitable manner relatively to each other, in a well understood manner the secondary coil having the terminals 6, and said coil being arranged adjacent or nearest the magnetic core, as seen in Fig. IV.

My improved transformer core is formed of successive layers of separable sections, plates or laminæ, 1 and 2, Fig. III, each lamina being made of two sheet iron or steel punchings adapted to be fitted edgewise together, the plate 1 being of uniform width except as hereinafter described, rectangular in form with rounded corners and adapted to envelop the said primary and secondary coils as seen in Figs. I and IV. The cross plate or punching 2 forms a middle limb of the core which enters within the said coils and has two of its diagonally opposite corners rounded and outwardly extended and is adapted to snugly fit within the corresponding recesses 7 and 8 of the plate 1, as seen in Fig. III. The successive and adjacent laminæ thus formed are reversed so as to break joints, being so piled up when in position that the said rounded corners of the plate 2 will be on alternately opposite sides of a median transverse line on said core, thus successfully bridging the magnetic air-gaps incident to the described manner of joining the said punchings 1 and 2, as seen in dotted outline in Figs. I and IV. The said laminæ may be also made in a variety of modified forms as seen in Figs. V, VI, VII, and VIII, in all of which the cross plate 2 enters within the coils, presents twice the conducting surface of the enveloping plate 1 and forms but two air-gaps which are bridged by reversing the successive and adjacent laminæ so as to break joints, as before described, and in each instance both plates 1 and 2 can be simultaneously stamped from the same sheet thereby economizing both time and material.

I do not hereby limit myself to the precise forms herein shown and described since the contour of the transverse interlocking plate may be indefinitely varied without departing from the spirit of my invention.

It is obvious that this construction and arrangement of the transverse plate 2 afford a path of low resistance for the magnetic flux, being free from breaks and uniting the continuous plates surrounding the coils.

When the coil 9, formed of the united primary and secondary coils, is completed as above described, the inclosing or surrounding plates 1 are placed in position in a well understood manner, by slipping them over the said coil and are arranged in successive layers, each alternate plate being reversed for the purpose of breaking joints and each successive surrounding plate being correspondingly fitted with a transverse plate 2 passed through the said coil, and this method of arranging the laminæ is so continued until the said core is completed, by which construction the air-gaps in the magnetic circuit are effectually bridged. The said coil 9 is then rigidly secured in position within the enveloping core by suitable blocks of insulating material pressed into the core spaces 10 of Fig. II. The terminals 4 of the primary coil are then connected to the high potential mains, and the secondary terminals 3 are connected to the lamp circuit.

While it is obvious that a transformer core formed of integral plates or laminæ would present a magnetic circuit of the least resistance, yet the proper arrangement of the coils therein or thereon is such that the economy and convenience of manufacture require a construction in which the successive laminæ are composed of separable parts which necessitates a greater or less number of air-gaps; but as air offers a greater magnetic resistance than iron, the well known effect of an air-gap in a magnetic circuit is to strangle the flow of magnetic lines and produce such a throttling or resistance of the magnetic circuit as to seriously increase the leakage and greatly diminish the magnetic flux, requiring an increased current for the same amount of magnetization of the core. It follows therefore that under like conditions the fewer the air-gaps in a transformer core the more efficient will be the apparatus. Another well known effect of air-gaps in the magnetic circuit is to require an increase in the quantity of iron in the core to lower the magnetic resistance; but as this increase in the quantity of iron to overcome the effect of the air-gaps proportionately increases the energy lost by hysteresis, and as a transformer is continuously at work as long as the primary mains are in use whether or not current is being used from the secondary, this increase of iron in the core is seriously objectionable from an economic point of view.

It is believed that by my improved construction and arrangement of the separable stampings by which but two air-gaps are required and they are successfully bridged by the alternately overlapping laminæ, the magnetic resistance of the core has been reduced to a minimum, and a given density of magnetic flux is secured by the use of a less quantity of iron, thereby reducing the weight and cost of the transformer as well as the loss of energy by hysteresis.

Having thus described my invention and the manner in which the same is operated, what I claim as new and useful, and desire to secure by Letters Patent, is—

1. In an electric transformer for alternating or pulsating currents, a laminated iron envelope or core, having its laminæ made each of two sheet iron punchings, one of which is a continuous plate adapted to surround the coils, and is provided upon its opposite sides of greatest length, with oppositely inclined recesses, midway its ends, and provided with a transverse punching forming a middle limb entering within the coils and adapted to fit the said recesses, the adjacent layers being reversed whereby the abutting edges of the said plates meet out of coincidence and thereby break joints, all substantially as described.

2. In an electric transformer for alternating or pulsating currents, the combination of the primary and secondary coils with a continuous surrounding envelope of laminated iron, each lamina having a cross plate entering within the coils, as shown, so arranged that by the abutting edges of said plates being out of coincidence with those of each reversed adjacent or alternate lamina, they will break joints, substantially as described.

3. In an electric transformer for alternating or pulsating currents, the combination with the primary and secondary coils, of the laminated core, each successive lamina comprising two punchings, one a continuous plate 1, adapted to inclose the coils, provided with recesses in the sides thereof and the other a cross plate 2 entering within the coils, adapted to fit the said recesses in such a manner that in each alternately reversed lamina it will form overlapping and interlocking sections at both extremities thereof and thus break joints, substantially as described.

Signed by me, at Fort Wayne, Allen county, State of Indiana, this 11th day of April, 1894.

MALCOLM DICKERSON.

Witnesses:
KATE B. CHAPIN,
JAMES BAXTER.